(12) United States Patent
Fritz

(10) Patent No.: US 7,734,044 B2
(45) Date of Patent: Jun. 8, 2010

(54) METHOD AND APPARATUS FOR SYNCHRONOUS STREAM CIPHER ENCRYPTION WITH RESERVED CODES

(75) Inventor: Matthew John Fritz, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 207 days.

(21) Appl. No.: 11/360,138

(22) Filed: Feb. 23, 2006

(65) Prior Publication Data

US 2008/0019513 A1    Jan. 24, 2008

(51) Int. Cl.
  *H04L 9/18* (2006.01)
  *H04L 9/20* (2006.01)
  *H04L 9/22* (2006.01)
  *H04L 9/00* (2006.01)

(52) U.S. Cl. .............. 380/37; 380/42; 380/28; 380/255; 380/260; 380/262; 380/274; 713/153; 713/168

(58) Field of Classification Search .............. None
  See application file for complete search history.

(56) References Cited

U.S. PATENT DOCUMENTS

| | | | |
|---|---|---|---|
| 6,587,562 B1 * | 7/2003 | Jansen et al. | 380/262 |
| 6,909,785 B1 * | 6/2005 | Rose | 380/260 |
| 6,944,253 B2 * | 9/2005 | Ozluturk | 375/377 |
| 6,975,730 B1 * | 12/2005 | Kuroiwa et al. | 380/284 |
| 7,058,178 B2 * | 6/2006 | Jansen et al. | 380/37 |
| 7,190,787 B1 * | 3/2007 | Graunke et al. | 380/42 |
| 7,206,940 B2 * | 4/2007 | Evans et al. | 713/193 |
| 2001/0031050 A1 * | 10/2001 | Domstedt et al. | 380/44 |
| 2002/0006137 A1 * | 1/2002 | Rabenko et al. | 370/466 |
| 2002/0186840 A1 * | 12/2002 | Rose | 380/37 |
| 2003/0012406 A1 * | 1/2003 | Iwamura | 382/100 |
| 2003/0161467 A1 * | 8/2003 | Cheng et al. | 380/44 |
| 2004/0034772 A1 * | 2/2004 | Alao | 713/168 |
| 2004/0086117 A1 * | 5/2004 | Petersen et al. | 380/44 |
| 2006/0193472 A1 * | 8/2006 | Yuen | 380/274 |

OTHER PUBLICATIONS

"Link Encryption for 1.5Gb/s[1] Serial Digital Interface", SMPTE Standard for D-Cinema, The Society of Motion Picture and Television Engineers, Jun. 21, 2005, pp. 1-36, www.smpte.org.

* cited by examiner

*Primary Examiner*—Syed A. Zia
(74) *Attorney, Agent, or Firm*—Chrles A. Brill; Wade James Brady, III; Frederick J. Telecky, Jr.

(57) ABSTRACT

A method and apparatus for a signal encryption device constructed to perform synchronous stream cipher encryption for a sequence of input words with restricted codes. The encryption device includes a keystream generator for producing a sequence of pseudorandom words from a key, and an adder that is used to sum the output of the keystream generator and the input words. A lookup table of size substantially twice the number of possible input words provides encrypted codes excluding restricted codes from the summed signal. A signal encryption and decryption system is constructed by including a second keystream generator for producing a second sequence of pseudorandom words from the key, and a second adder to produce a second summed signal from the output of the second keystream generator and the encrypted codes. A corresponding lookup table provides decrypted codes excluding restricted codes from the second summed signal.

12 Claims, 2 Drawing Sheets

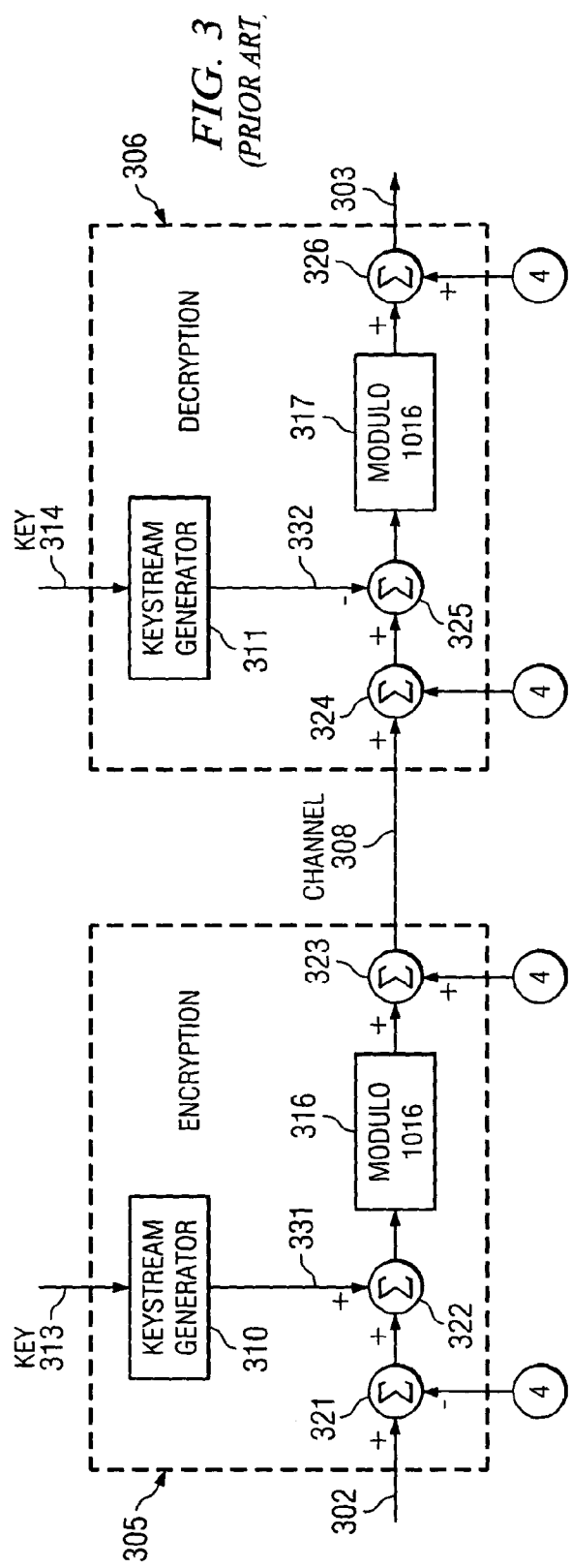
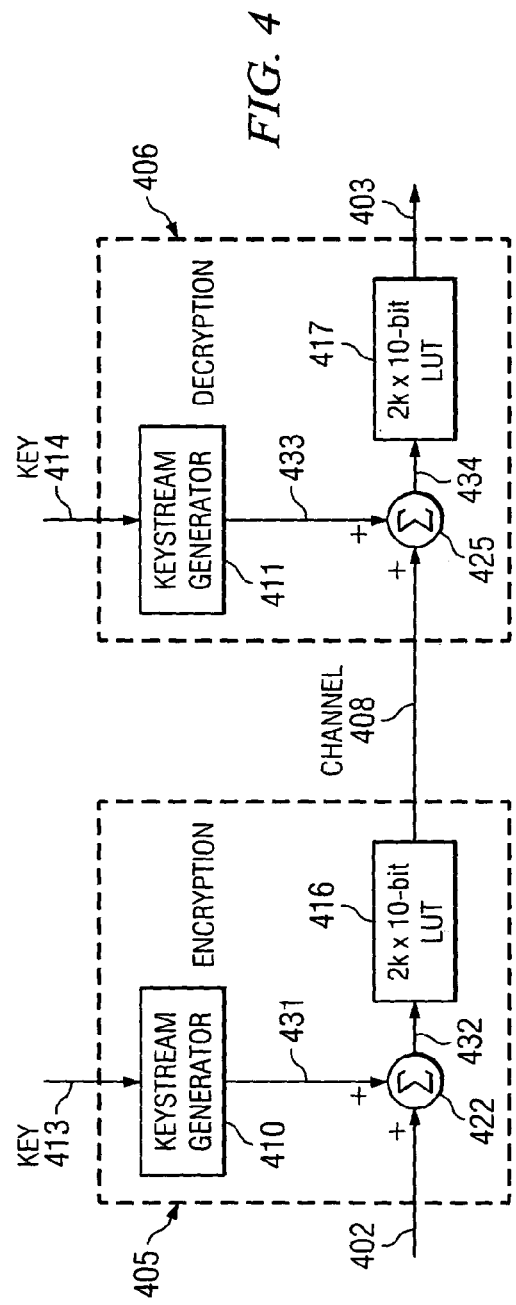

METHOD AND APPARATUS FOR SYNCHRONOUS STREAM CIPHER ENCRYPTION WITH RESERVED CODES

TECHNICAL FIELD

This invention relates generally to digital encryption devices, and in particular, to a method and implementation for synchronous stream cipher encryption of digital data with reserved codes.

BACKGROUND

When a signal containing valuable signal content, particularly a digital signal with video content, is transmitted from an information source through a channel to a receiver, it is frequently necessary to encrypt the signal to prevent unwanted reception by an unintended receiver. To reliably prevent unwanted reception, the plaintext digits of the input signal are frequently encrypted one digit at a time using a key that differently encodes the successive digits before transmission through the channel. A process that uses different encoding for successive digits is called a "stream cipher," which can be very secure against an undesired receiver. When decryption is performed using the same key, the process is further described as being "symmetric." Stream ciphers are a frequently preferred encryption process because the amount of digital computation is substantially reduced compared to alternative encryption processes that encode large blocks of input data. Symmetric encryption processes are also preferred due to the resulting simplicity for a user to manage keys.

Encoding with a key invariably results in an encoding period over which the encryption process repeats. However, for a substantially complex keystream generator, such as a 128-bit AES (Advanced Encryption Standard, also called "Rijndael," a widely used block cipher created by Joan Daemen and Vincent Rijmen) core, the length of encoding period repetition is sufficiently long to render the encryption substantially unbreakable. For even higher levels of security, the key can be changed before the encoding period repeats.

Synchronous stream cipher encryption refers to a process operating on a stream of input words wherein word-by-word encryption is performed independently of the input data stream. A commercial application frequently relying on synchronous stream cipher encryption is projection of digital video images in movie theaters. A typical digital cinema projection system includes a playback server that produces a digital video signal for a coaxial link to a digital video projector, such as a DLP® projector. Strong signal encryption is necessary for the coaxial link, because the video data produced by the server generally contains substantially higher video resolution than commonly available DVD video discs, which produces high value in alternative markets. Video data contained in server memory is already strongly encrypted to prevent reproduction. Unencrypted video data openly transmitted over a coaxial link can easily be diverted to an unintended receiver for easy unencrypted capture.

FIG. 1 illustrates a digital channel typically used in cinemas to couple a video source (not shown) to a projector (not shown). Input video signals 105 and 106 containing luminance and chrominance video data, respectively, usually with 10-bit precision, are encrypted in blocks 108 and 109. The digital encrypted signals from these blocks are multiplexed by multiplexer 110 over coaxial link 112 that transmits binary data to demultiplexer 114. After decryption of the demultiplexed signals in blocks 115 and 116, plaintext luminance and chrominance signals are reproduced on output leads 117 and 118.

A typical coaxial link between a server and a projector used in commercial cinemas is a 1.45 Gb/s HD-SDI (high definition, serial digital interface) link. An HD-SDI link is a 10-bit link with 1024 possible data codes. For 10-bit words representing a video signal, eight codes are restricted by commonly used video specification SMPTE-292 so that synchronization and other control functions can be provided for the video equipment. The eight restricted codes in the SMPTE-292 specification are the first four and last four 10-bit binary codes of the 1024 possible codes in a 10-bit signal, i.e., the codes are 0000, . . . , 0003 and 1020, . . . , 1023 (represented here using decimal notation). For a functional channel, these eight restricted codes cannot be encrypted without disabling operation of the projector. Thus, a modulator/demodulator pair in such systems is not permitted to generate or operate on these restricted codes.

FIG. 2 shows a digital signal encryption process of the prior art often used for video signals. Encryption is accomplished by modulating the plaintext input with a pseudorandom keystream in the server, and decryption is accomplished by demodulating the resulting ciphertext with the same pseudorandom keystream in the projector. Using lookup tables ("LUTs") and an AES core running in counter mode as the keystream generator, strong, efficient encryption and decryption engines can be realized. Encryption/decryption arrangements that use substantially identical processes for encryption and decryption are called "complementary."

In FIG. 2, a plaintext data stream, typically comprising 10-bit video words, is supplied as signal 202 from a video source to encryption block 205. Using a key 213 inputted to encryption block 205, keystream generator 210 produces a stream of pseudorandom, 10-bit words on lead 231. Encoding is performed using lookup table 216 that contains possible combinations of 10-bit input words and 10-bit pseudorandom words from the keystream generator 210. The resulting 10-bit ciphertext data stream produced by the lookup table and transmitted on lead 208 is inputted to decryption block 206. In decryption block 206, keystream generator 211, using key 214, produces a stream of pseudorandom 10-bit words on lead 232. Decoding is performed using lookup table 217 that again contains possible combinations of 10-bit input words and 10-bit words from the key-stream generator 211. Plaintext output data is provided on lead 203. This encryption/decryption arrangement can be constructed to be symmetric and complementary.

The arrangement illustrated in FIG. 2 can be used to produce ciphertext excluding the eight restricted words, and is operable with a wide range of encoding maps. It can implement nearly any other coding scheme by appropriately defining the lookup table mapping data. However, a significant disadvantage of this scheme is the large amount of memory that is required for the lookup table, which renders it impractical to implement using, for example, presently produced FPGAs (field-programmable gate arrays). For a 10-bit data input/10-bit encryption system commonly used in cinema applications, a lookup table with roughly a million entries is required.

A second modulator/demodulator arrangement of the prior art that can be used to produce ciphertext excluding the eight restricted words is illustrated in FIG. 3. In FIG. 3, a plaintext 10-bit data stream 302 is inputted to encryption block 305. Encryption is performed by inputting a key 313 to keystream generator 310, which produces a pseudorandom stream of 10-bit words on lead 331. The plaintext input 302 is coupled to adder 321, which subtracts the number 4 from the input data. The output from adder 321 and the output of keystream generator 310 are coupled to adder 322, producing an 11-bit summed output, supplied to block 316. Block 316 performs a modulo-1016 operation on its input, and its output is coupled to adder 323, which adds the number 4 to the input data to produce the 10-bit ciphertext output on lead 308, which is transmitted over a communication channel such as coaxial line. In a modulo operation such as encountered with a summing operation, a summed result that exceeds the modulo index is altered by subtracting the modulo index from the summed result, eliminating thereby the possible need for an additional bit to represent the summed result.

Upon reception at the remote end of the communication channel, the decryption process performed in block 306 uses key 314 supplied to keystream generator 311, which produces a pseudorandom stream of 10-bit words represented by 332. Three adders, 324, 325, and 326, are also used in the decryption process, subtracting and then adding the number 4 to the data stream to produce 10-bit plaintext output 303. Block 317 performs a further modulo-1016 operation.

The process illustrated in FIG. 3 is used in movie theaters to provide video data protection for projection arrangements requiring exclusion of the eight restricted binary codes. This scheme requires no memory for lookup tables, but requires six to eight 10-bit adders (possibly including two for the two modulo functions). This scheme is the most restrictive in terms of selecting an encryption mapping, and is inefficient in terms of the amount of digital processing that must be performed for each input data word, requiring six to eight independent addition operations. The substantial number of arithmetic operations required to support a high-definition video signal, such as 1.45 Gb/s, results in a need for high-performance digital circuit elements, which add die area and expense to an integrated circuit.

The use of modulator/demodulator pairs, particularly pairs based on addition or modulo addition for synchronous stream cipher encryption, with and without restricted words, is well-known in the art. However, limitations of prior art processes in arrangements that exclude encoding of restricted words from the data stream and maintaining a high level of data security are a need for large lookup tables or extensive digital computation for encryption/decryption for each input word. Prior art schemes are also hampered by inflexibility in selection of data mappings. A need thus exists for an apparatus and method to perform highly secure encryption and decryption that is not encumbered by these limitations, particularly for systems communicating high data rate signals.

SUMMARY OF THE INVENTION

Embodiments of the present invention achieve technical advantages as a signal encryption device that performs synchronous stream cipher encryption for a sequence of input words with restricted codes. The signal encryption device receives a key and a stream of input words. The signal encryption device includes a keystream generator producing a stream of pseudorandom words from the key, and an adder coupled to the keystream generator and to the input words, producing a summed signal stream therefrom. A lookup table using the summed signal stream produces encrypted codes for the input words excluding the restricted codes.

In accordance with a further preferred embodiment, a signal decryption device receives a key and a stream of encrypted words with restricted codes. The signal decryption device includes a keystream generator for producing a stream of pseudorandom words from the key, and an adder coupled to the keystream generator and to the stream of encrypted words, producing a summed signal stream therefrom. A lookup table using the summed signal stream produces decrypted codes excluding the restricted codes for the input words.

In a further preferred embodiment, a signal encryption and decryption system performs synchronous stream cipher encryption and decryption for a sequence of input words. The system receives a key and a stream of input words with restricted codes. The system includes a keystream generator for producing a stream of pseudorandom words from the key, and an adder coupled to the keystream generator and to the input words, producing a summed signal stream therefrom. A lookup table using the summed signal stream produces encrypted codes for the input words excluding the restricted codes. The system further includes a second keystream generator for producing a second stream of pseudorandom words from the key, and a second adder coupled to the second keystream generator and to the stream of encrypted words, producing a second summed signal stream therefrom. A second lookup table using the second summed signal stream produces decrypted codes for the input words excluding the restricted codes.

Another embodiment of the present invention is a method of performing synchronous stream cipher encryption for a sequence of input words with restricted codes. The method includes receiving a key and a stream of input words. The method further includes producing a stream of pseudorandom words from the key using a keystream generator, and producing a summed signal from the output of keystream generator and the stream of input words. The method further includes using a lookup table accessed by the summed signal to produce encrypted codes for the stream of input words excluding the restricted codes.

In a further preferred embodiment, the method includes performing synchronous stream cipher decryption for a sequence of encrypted words with restricted codes. The method includes receiving a key and a stream of encrypted words. The method further includes producing a stream of pseudorandom words from the key using a keystream generator, and producing a summed signal stream from the output of keystream generator and the encrypted words. The method further includes using a lookup table accessed by the summed signal stream to produce decrypted codes for the encrypted words excluding the restricted codes.

The invention solves the problem of encrypting an input sequence of words with restricted codes without the need for substantial memory, or the need for substantial digital processing.

Embodiments of the present invention advantageously provide a signal encryption device and a signal decryption device and method that can encrypt input words with restricted codes using minimal memory while using minimal digital computation to perform encryption and decryption processes.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 illustrates a block diagram of the prior art showing encryption and decryption of a 10-bit input signal with restricted codes using six adders and two modulo operations;

FIG. 4 illustrates a block diagram of an embodiment of the invention showing encryption and decryption of a 10-bit input signal with restricted codes using two adders and lookup tables, each table with approximately two entries for each possible input word.

DETAILED DESCRIPTION OF ILLUSTRATIVE EMBODIMENTS

Figure 1:
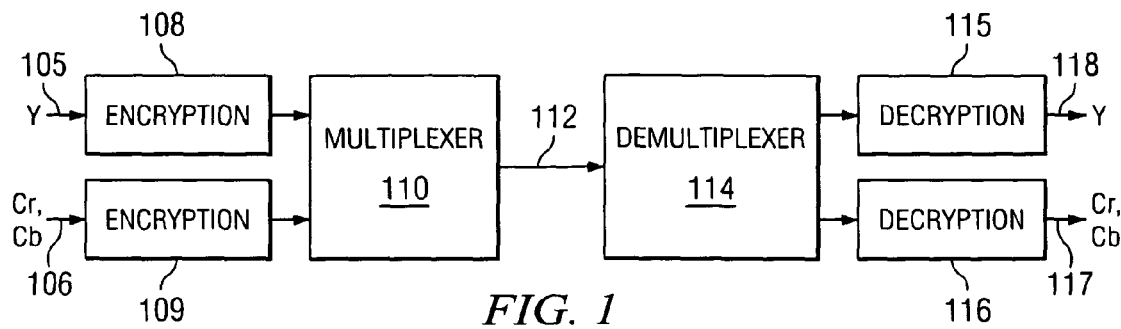
FIG. 1 illustrates an exemplary block diagram of the prior art showing and encryption and decryption of 10-bit video luminance and chrominance video signals.
Figure 2:
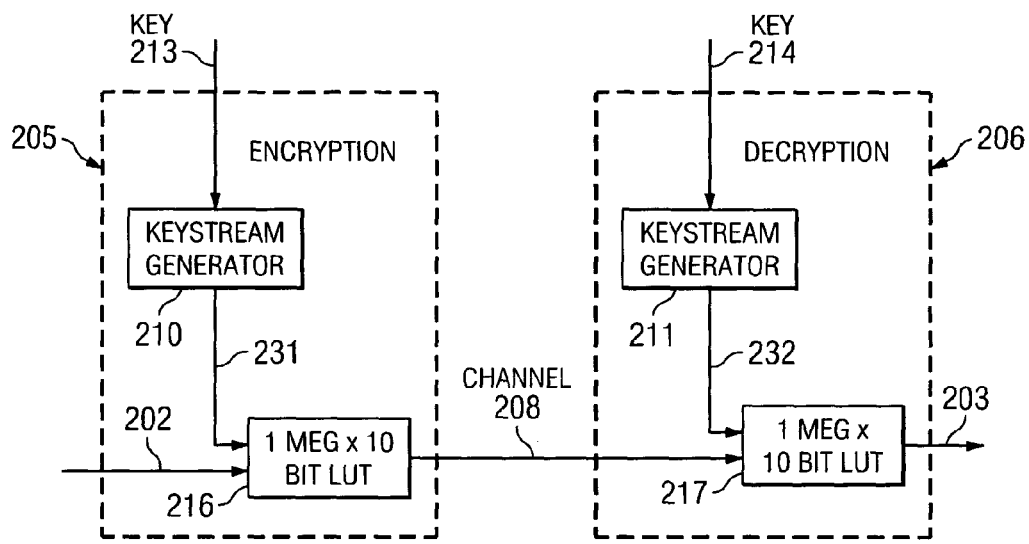
FIG. 2 illustrates a block diagram of the prior art showing encryption and decryption of a 10-bit input signal with restricted codes using a lookup table of size sufficient to contain combinations of input and keystream data.

The making and using of presently preferred embodiments are discussed in detail below. It should be appreciated, however, that the invention provides many applicable inventive concepts that can be embodied in a wide variety of specific contexts. The specific embodiments discussed are merely illustrative of specific ways to make and use the invention, and do not limit the scope of the invention.

Embodiments of the invention will be described with respect to preferred embodiments in a specific context, namely an apparatus and method for encoding a digital data stream containing reserved data codes in both the unencoded and encoded data streams. Embodiments comprise processes that can be symmetric and complementary to perform signal encryption and decryption.

FIG. 4 illustrates an exemplary embodiment of an encryption and decryption process and method of the present invention that can perform encryption and decryption excluding restricted codes such as the eight restricted codes in an HD-DSI link operating with the SMPTE-292 specification. Input plaintext data stream 402, typically but not necessarily 10-bit words representing a video signal, is coupled to encryption block 405. Encryption block 405 includes keystream generator 410 that receives key 413 and produces bit stream 431 of pseudorandom, 10-bit words for encoding input data. This pseudorandom bit stream and plaintext input data are added word by word in adder 422 to produce an 11-bit result on line 432. Using a lookup table, 416, a ciphertext stream of 10-bit words is produced and coupled to channel 408. The lookup table 416 in the present example contains 2048−16=2032 entries, each with 10-bits, and is described further hereinbelow. The channel 408 may transmit the data bit by bit such as described by video specification SMPTE-292. The input data for the eight restricted codes are not encrypted.

The mapping contained in lookup table 416 is arranged so that no restricted code is generated by the encryption process. The lookup table mapping is complementary so that the modulation result produced by adder 422 can be demodulated by second adder 425. The lookup table mapping is substantially the same for both the encryption and decryption processes. The same key can be used for both processes, and can be changed from time to time for improved security.

The decryption block 406 operates in a similar manner. Decryption block 406 includes keystream generator 411 that receives key 414, and produces bit stream 432 of pseudorandom, 10-bit words for decoding the ciphertext data supplied on line 408. Preferably the keys 413 and 414 are the same key, i.e., the system can be symmetric. The bit stream 433 and ciphertext input data are added word by word in adder 425 to produce an 11-bit result as signal 434. Using lookup table 417, a plaintext stream of 10-bit words is produced and coupled to the output, 403. The lookup table 417 contains 2048−16=2032 entries, each with 10-bits, and is preferably substantially identical to lookup table 416, i.e. the process can be complementary. The decryption process can be thought of as "flipping over" the table used for encryption.

An exemplary lookup table in an embodiment of the invention can be constructed using the equation, $$Y=[((A-X)-4) \bmod{1016}]+4$$

where the term A is an arbitrary constant, X is the input to the lookup table, and Y is the output from the lookup table. As a particular example, the value for A can be chosen to be 917. For the example using A=917, the following lookup table is produced for 2032 input entries representing 11-bit words, with inputs and outputs as indicated below:

| Input | Output |
|-------|--------|
| 0 | 917 |
| 1 | 916 |
| 2 | 915 |
| ... | ... |
| 912 | 5 |
| 913 | 4 |
| 914 | 1019 |
| 915 | 1018 |
| ... | ... |
| 1928 | 5 |
| 1929 | 4 |
| 1930 | 1019 |
| 1931 | 1018 |
| ... | ... |
| 2046 | 903 |
| 2047 | 902 |

By properly constructing the outputs indicated in the table above, none of the eight restricted codes is produced. In addition, it is noted that more than one input can produce the same output, as expected by this encryption process.

Figure 5:
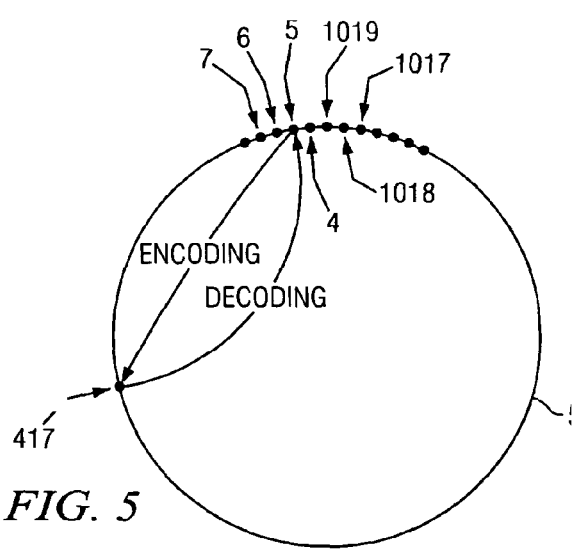
FIG. 5 illustrates a circular table of an embodiment of the invention showing indexed transitions for encoding and decoding of a 10-bit input word with restricted codes.

An encryption/decryption process in an embodiment of the invention can be further described with reference to FIG. 5. Illustrated is a circle 501 that represents a circular table containing labeled entries for a 10-bit input word, with 1016 possible values that are to be encrypted, which excepts the eight restricted codes in the SMPTE-292 specification. The cells in the table are labeled 4, 5, . . . , 1018, 1019. Thus, the table contains 1016 entries, with no positions for the eight restricted codes. In the example illustrated in FIG. 5, encoding of a plaintext input word is performed by selecting a table entry indexed "D" entries counterclockwise from the input word to produce a ciphertext word. Decoding of the ciphertext word is then performed by selecting a table entry indexed "D" entries clockwise from the ciphertext word. In the example illustrated in FIG. 5, during encryption, table entry number 5 is indexed counterclockwise by 412 to produce table entry 417. In the reverse process during decryption, table entry number 417 is indexed clockwise by D=412 to produce table entry 5. Such reverse operation can be performed by operating an "adder" in a subtraction mode. The table entry index D is a pseudorandom number that may be derived from an input key, which may be altered from time to time to provide a high level of security for encryption of the input data stream. Thus, the digital arithmetic that must be performed on each input word is merely indexing in a circular table, which can be performed with minimal digital computation, and is readily amenable to operation with a high data rate stream, for example to encrypt a 1.45 Gb/s data link. The more extensive computation necessary to compute a pseudorandom index D to select an encrypted or decrypted word can be performed at a substantially slower rate without substantially compromising encryption security.

An improvement of this process over the prior art is the absence of a need for an extensive table for encryption or decryption. Additionally, the need for extensive digital computation for input words is also thereby avoided. And furthermore, flexibility of supported channel coding schemes and required reserved codes is increased via a simple redefining of the LUT mapping.

Although embodiments of the present invention and its advantages have been described in detail, it should be understood that various changes, substitutions and alterations can be made herein without departing from the spirit and scope of the invention as defined by the appended claims. For example, it will be readily understood by those skilled in the art that the methods and utilization of techniques to form the processes and systems providing signal encryption and decryption for data streams with reserved codes as described herein may be varied while remaining within the broad scope of the present invention. It will be further understood by those skilled in the art that various video signal representations such as RGB and gray-scale video representations can be substituted for the luminance-chrominance video signal representations in processes described hereinabove with accommodations as necessary, within the broad scope of the invention. The 10-bit word size may be altered in the broad scope of the invention in other applications, including other video systems. As another example, the method and apparatus also may be used on data other than video data.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A signal encryption device constructed to receive a key and an input word with restricted codes, the device comprising:
   a keystream generator for producing a pseudorandom word from the key;
   an adder coupled to the keystream generator for receiving the pseudorandom word and coupled to the input word, and producing a summed signal therefrom; and
   a lookup table using the summed signal to produce an encrypted code excluding the restricted codes for the input word, wherein the signal encryption device does not generate or operate on the restricted codes, wherein the device performs synchronous stream cipher encryption for a sequence of input words, the keystream generator produces a sequence of pseudorandom words in response to the key with a period of repetition, and the key is changed before the period of repetition repeats.

2. The signal encryption device according to claim 1, wherein a size of the lookup table is substantially twice a number of possible input words.

3. A signal decryption device constructed to receive a key and an encrypted input word with restricted codes, the device comprising:
   a keystream generator for producing a pseudorandom word from the key;
   an adder coupled to the keystream generator for receiving the pseudorandom word and coupled to the encrypted input word and producing a summed signal therefrom; and
   a lookup table using the summed signal to produce a decrypted code excluding restricted codes for the encrypted input word, wherein the signal decryption device does not generate or operate on the restricted codes, wherein the device performs synchronous stream cipher decryption for a sequence of input words, and wherein the keystream generator produces a sequence of pseudorandom words in response to the key with a period of repetition and the key is changed before the period of repetition repeats.

4. A signal encryption and decryption system comprising:
   a first keystream generator for producing a first pseudorandom word from a received key;
   a first adder coupled to the first keystream generator and receiving an input word with restricted codes, and producing a first summed signal from the first pseudorandom word and the input word;
   a first lookup table using the first summed signal to produce an encrypted word excluding the restricted codes;
   a second keystream generator for producing a second pseudorandom word from the key;
   a second adder coupled to the second keystream generator for receiving the second pseudorandom word and receiving the encrypted word to produce a second summed signal therefrom; and
   a second lookup table using the second summed signal to produce a decrypted code excluding the restricted codes for the encrypted word, wherein the decrypted code is substantially the same as the input word, and wherein the signal encryption and decryption systems do not generate or operate on the restricted codes, wherein the system performs synchronous stream cipher encryption for a sequence of input words, the first and second keystream generators produce a sequence of pseudorandom words in response to the key with a period of repetition, and the key is changed before the period of repetition repeats.

5. The signal encryption and decryption system according to claim 4, wherein the encryption and decryption system is complementary.

6. A method of producing an encrypted code for an input word with restricted codes from a key, the method comprising:
   performing synchronous stream cipher encryption for a sequence of input words by:
   generating a pseudorandom word from the key using a keystream generator;
   summing the input word and the pseudorandom word to produce a summed signal therefrom;
   applying a lookup table to the summed signal to produce the encrypted code for the input word excluding the restricted codes, wherein the restricted codes are not operated upon or generated while producing the encrypted code; and
   generating a sequence of pseudorandom words with a period of repetition in response to the key using the keystream generator, and changing the key before the period of repetition repeats.

7. The method according to claim 6, wherein the lookup table has a size substantially twice a number of possible input words.

8. A method of producing a decrypted code for an encrypted input word with restricted codes from a key, the method comprising:

performing synchronous stream cipher decryption for a sequence of encrypted input words by:

generating a pseudorandom word from the key using a keystream generator;

summing the encrypted input word and the pseudorandom word to produce a summed signal therefrom; and applying a lookup table to the summed signal to produce a decrypted word for the encrypted input word excluding the restricted codes, wherein the restricted codes are not operated upon or generated while producing the decrypted code, and wherein the keystream generator produces a sequence of pseudorandom words in response to the key with a period of repetition and the key is changed before the period of repetition repeats.

9. A method of encrypting and decrypting an input word with restricted codes from a key, the method comprising:

producing a pseudorandom word from the key using a keystream generator;

summing the input word and the pseudorandom word to produce a first summed signal therefrom;

applying a first lookup table to the first summed signal to produce an encrypted code for the input word excluding the restricted codes;

producing a second pseudorandom word from the key using a second keystream generator;

summing the encrypted code and the second pseudorandom word to produce a second summed signal therefrom;

applying a second lookup table to the second summed signal to produce a decrypted code excluding the restricted codes for the encrypted code, wherein the restricted codes are not operated upon or generated during the encrypting or decrypting;

performing synchronous stream cipher encryption for a sequence of input words;

producing a sequence of pseudorandom words with a period of repetition with the keystream generator in response to the key, and changing the key before the period of repetition repeats.

10. The method according to claim 9, wherein the encrypting and decrypting are complementary.

11. The method according to claim 9, wherein the first lookup table comprises a circular table with no positions for the restricted codes, wherein applying a first lookup table is performed by indexing entries counterclockwise from the first summed signal to produce the encrypted code.

12. The method according to claim 11, wherein the first lookup table comprises a circular table with no positions for the restricted codes, and wherein applying a second lookup table is performed by indexing entries clockwise from the second summed signal to produce the decrypted code.

* * * * *